United States Patent [19]

Sievers et al.

[11] Patent Number: 5,942,719

[45] Date of Patent: Aug. 24, 1999

[54] ALKALI METAL THERMAL TO ELECTRIC CONVERSION (AMTEC) CELLS

[75] Inventors: Robert K. Sievers; Rahul Mital, both of Ann Arbor, Mich.

[73] Assignee: Advanced Modular Power Systems, Inc., Ann Arbor, Mich.

[21] Appl. No.: 08/901,371

[22] Filed: Jul. 28, 1997

[51] Int. Cl.⁶ .................................................. H01L 35/30
[52] U.S. Cl. ........................ 136/205; 136/242; 136/204; 136/212
[58] Field of Search ..................................... 136/203, 204, 136/205, 212, 242; 429/102, 104, 112, 120, 17; 62/3.2

[56] References Cited

U.S. PATENT DOCUMENTS

| | | | |
|---|---|---|---|
| 4,098,958 | 7/1978 | Bettman | 429/17 |
| 4,808,240 | 2/1989 | Sievers | 136/202 |
| 5,039,351 | 8/1991 | Cooper et al. | 136/202 |
| 5,089,054 | 2/1992 | Sievers | 136/202 |
| 5,228,922 | 7/1993 | Sievers | 136/202 |
| 5,441,575 | 8/1995 | Underwood et al. | 136/202 |
| 5,492,570 | 2/1996 | Horner-Richardson et al. | 136/200 |

OTHER PUBLICATIONS

"Performance Analysis of a Multitube Vapor–Anode AMTEC Cell", Tournier, Jean–Michel, ElGenk, Mohamed S., Huang, Lianmin, and Schuller, Michael, Institute for Space and Nuclear Power Studies, Dept. of Chemical and Nuclear Engineering, The University of New Mexico, Albuquerque, NM, and Power Systems Branch, Phillips Laboratory, Kirtland AFB, Alburquerque, NM, Document No. 97–378, No month and year provided.

PX Series AMTEC Cell Design, Testing, and Analysis, Borkowski, C.A., Sievers, R.K., and Hendricks, T.J., Advanced Modular Power Systems, Inc., Ann Arbor, MI, Document No. 97421, No month and year provided.

"Thermal Modeling of High Efficiency AMTEC Cells", Ivanenok, Joseph F. III, Sievers, R.K., and Crowley, C.J., Advanced Modular Power Systems, Inc., Ann Arbor, MI, and Creare, Inc., Hanover, NH, No month and year provided.

"Design and Performance of Radioisotope Space Power Systems Based on OSC Multitube AMTEC Converter Designs", Schock, Alfred, Noravian, Heros, and Or, Chuen, Orbital Sciences Corporation, Germantown, MD, Document No. 97530, No month and year provided.

Primary Examiner—Kathryn Gorgos
Assistant Examiner—Thomas H Parsons
Attorney, Agent, or Firm—Harness, Dickey & Pierce, PLC

[57] ABSTRACT

The present invention provides an alkali metal thermal to electric conversion cell having radially projecting beta-alumina type solid electrolyte elements and a central heat input region.

18 Claims, 2 Drawing Sheets

ALKALI METAL THERMAL TO ELECTRIC CONVERSION (AMTEC) CELLS

BACKGROUND OF THE INVENTION

1. Technical Field

The present invention generally relates to alkali metal thermal to electric conversion (AMTEC) cells and, more particularly, to an AMTEC cell including radially projecting beta aluminum-type solid electrolyte elements and a central heat input region.

2. Discussion

An AMTEC cell is a thermally regenerative concentration cell typically utilizing an alkali metal, such as sodium or potassium, as a working fluid and a solid electrolyte as an ion selective membrane. While sodium is referred to throughout this description as the working fluid, it is to be understood that other alkali metals are also applicable to this invention. The electrolyte separates the cell into a high pressure zone and a low pressure zone while permitting a nearly isothermal expansion of the alkali metal for generating high-current/low voltage power at high efficiency. To accomplish this, AMTEC cells commonly employ at least one beta-alumina type solid electrolyte (BASE) element, typically a tube, which is exposed to high-pressure sodium on a first surface and low-pressure sodium on an opposite surface. The BASE element's opposed surfaces are overlaid with permeable electrodes which are connected to each other through an external load circuit.

In operation, neutral sodium atoms incident on one surface of the BASE element release their electrons to one electrode (the anode). The resulting sodium ions pass through the element wall under the applied pressure differential and the emerging sodium ions are neutralized at the other electrode (the cathode) by electrons returning from the external load. As such, the pressure differential drives the sodium through the BASE element thereby creating an electrical current which passes through the external load resistance.

The neutral sodium vapor at the outer electrodes migrates through the chamber between the BASE element and the cell wall until it condenses at a low-temperature condenser at the cold end of the cell. From there, the sodium condensate flows through an artery containing a fine pore membrane commonly consisting of a packed metallic felt toward the high pressure zone of the cell. The liquid sodium evaporates at a high temperature evaporator which is coupled to the artery and is returned to the inside of the BASE element through a common plenum at the opposite "hot" end of the cell.

Early generation AMTEC cells include a single BASE element coaxially located within the interior volume of a cylindrically shaped cell wall. Later generation cells employ multiple BASE elements electrically coupled in series and aligned concentrically about and parallel to a longitudinal axis of a cylindrically shaped cell wall. Although these conventional cells have been quite successful, there is room for improvement in the art. For instance, it would be desirable to provide an AMTEC cell including many more BASE elements than according to the prior art while minimizing the amount of cell wall surface area available for parasitic heat transfer. It would also be desirable to provide an AMTEC cell having a single, centrally located, heat input region for conveying energy for heating the cell from a common heat source. Additionally, it would also be desirable to provide an expanding area between the BASE elements for alkali metal vapor flow. Furthermore, it would be desirable to provide a convenient platform for supporting significantly more BASE elements than according to the prior art.

SUMMARY OF THE INVENTION

The above and other objects are provided by an AMTEC cell having radially projecting BASE elements and a central heat input region. Preferably, the cell includes a pair of disk-shaped side walls having a central opening formed therein. The side walls are interconnected in spaced relation at the central opening by a cylindrically-shaped inner wall. The side walls are interconnected in spaced relation along their perimeter by a cylindrically-shaped outer wall. An annularly-shaped solid electrolyte support member is coupled proximate the cylindrical inner wall so as to define a plenum therebetween. A solid electrolyte structure including a plurality of electrolyte elements is coupled along the outer radial surface of the support member so as to radially project between the side walls. An annularly-shaped condenser is disposed adjacent the outer wall so as to communicate with a low pressure zone of the cell. The condenser condenses alkali metal vapor migrating through the low pressure zone from the solid electrolyte structure. At least one artery return channel is coupled to the condenser for directing the condensed alkali metal from the condenser toward a high pressure zone of the cell. An evaporator is coupled to each of the arteries for evaporating the condensed alkali metal into the high pressure zone to complete the cycle. In a preferred embodiment of the present invention, the solid electrolyte structure includes a plurality of beta alumina type solid electrolyte tubes radially extending from the tube support member toward the condenser. Subgroups of the tubes are electrically connected in series and communicate with an external load circuit for delivering a desired current from the cell. In another preferred embodiment of the present invention, multiple AMTEC cells of the aforementioned configuration are stacked adjacent one another such that the cylindrically-shaped inner and outer walls align edge to edge along a common longitudinal axis to form an elongated right cylinder-shaped AMTEC cell stack having an axial bore extending therethrough defining a central heat input region.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards an alkali metal thermal to electric conversion (AMTEC) cell stack having an overall cylindrical configuration with an axial bore formed therein. The cylindrical configuration of the AMTEC cell provides a convenient platform for supporting a solid electrolyte structure having a plurality of radially projecting beta alumina type solid electrolyte (BASE) elements. Orienting the BASE elements radially enables a substantially greater number of BASE elements to be employed than according to the prior art. This configuration also enables multiple cells to be stacked adjacent one another to provide enhanced power output while only requiring a single centralized heat input source. Although the AMTEC cell of the present invention is described below with reference to specific embodiments thereof, one skilled in the art will appreciate that these embodiments are merely exemplary of the type of AMTEC cell to which the present invention is directed.

Figure 1:
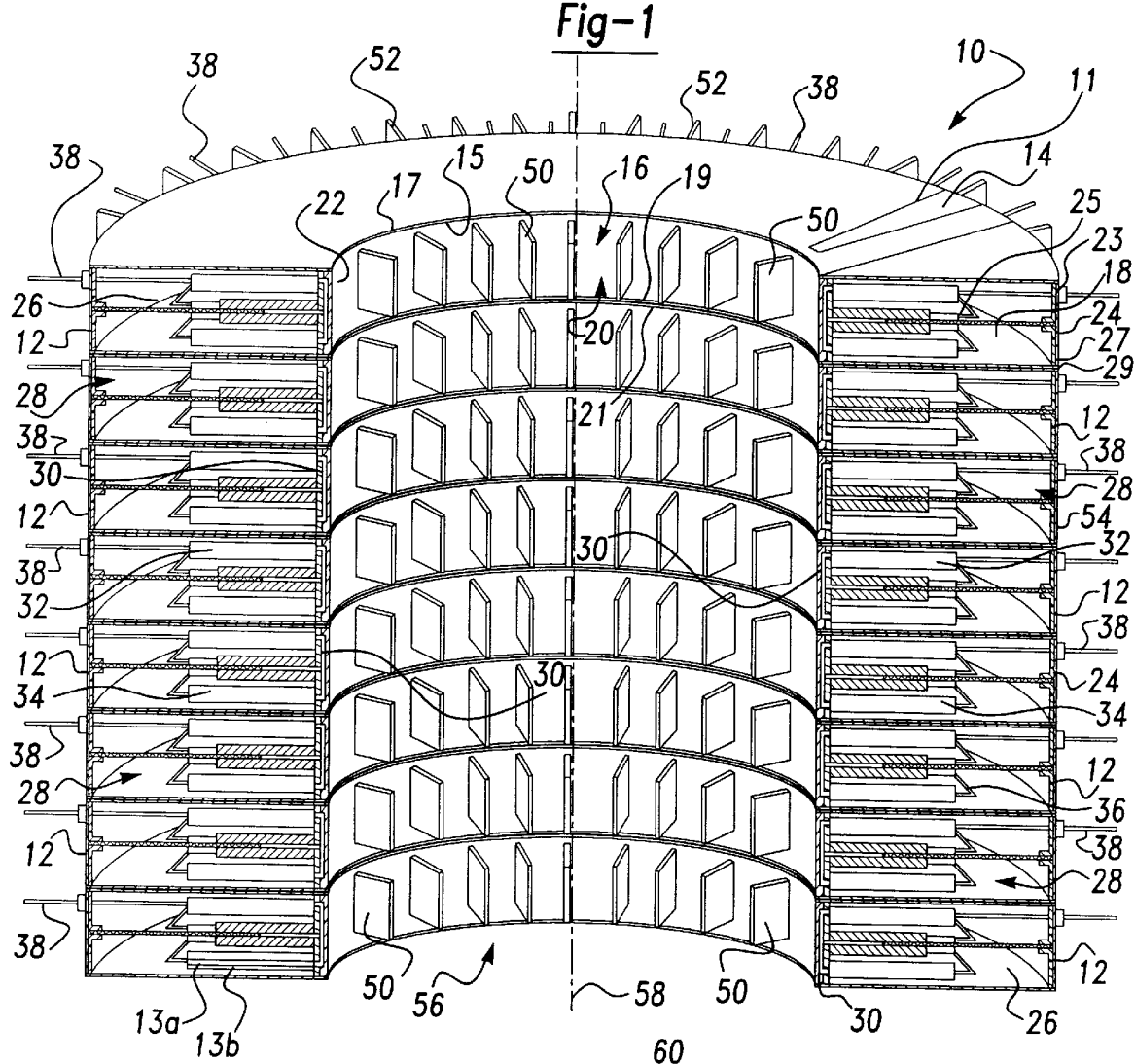
FIG. 1 is a perspective view in cross-section of an AMTEC cell stack having a cylindrical configuration in accordance with the teachings of the present invention.

Turning now to the figures, an AMTEC cell stack 10 including multiple AMTEC cells 12 incorporating the teachings of the present invention is illustrated in FIG. 1. Each AMTEC cell 12 includes a first disk-shaped side cell wall 14 having a circularly-shaped central opening 16 formed therein. A second disk-shaped side cell wall 18 is disposed in an axially spaced relation to the first side wall 14. The second side wall 18 also includes a circularly-shaped central opening 20 therein. Preferably, each of the first and second cell walls 14 and 18 includes corrugations 11 so that it may accomodate differentials in thermal expansion experienced during cell operation. Inconel is the preferred material for the cell walls, although stainless steel or any other material having the required thermal and structural properties may be used.

The first side wall 14 is interconnected to the second cell wall 18 along the circumference of the openings 16 and 20 by a cylindrically-shaped inner or hot end wall 22. The hot end wall 22 is preferably brazed or otherwise fixedly secured along a first rim 15 to the perimeter 17 of the opening 16 and is brazed or fixedly secured along a second rim 19 to the perimeter 21 of the opening 20. Inconel is the preferred material for the hot end wall 22.

The side walls 14 and 18 are interconnected in spaced relation at an outer circumference by a cylindrically-shaped outer or cold end wall 24. Preferably, the cold end wall 24 is brazed or otherwise fixedly secured along a first rim 23 to the perimeter 25 of the side wall 14 and is brazed or fixedly secured along a second rim 27 to the perimeter 29 of the side wall 18. As such, the side walls 14 and 18, in combination with the end walls 22 and 24, define an interior volume or chamber 26 for the cell 12. Stainless steel is the preferred material for the cold end wall 24 although other materials having the required structural and thermal properties may substitute therefore.

The chamber 26 is separated into a low-pressure zone 28 proximate the cold end wall 24 and a high pressure zone 30 proximate the hot end wall 22 by a solid electrolyte structure 32. In the illustrated embodiment, the solid electrolyte structure 32 includes a plurality of beta-alumina type solid electrolyte (BASE) tubes 34 electrically connected in series by leads 36 having first and second permeable electrodes 13a and 13b. The leads 36 are coupled to a terminal 38 projecting through the cold end cap 24 and exterior of the cell 12 for providing power output from the cell 12. Although the BASE tubes 34 are shown, it is to be understood that the present invention is also suitable for use in conjunction with solid electrolyte structures of other configurations such as flat plates.

A plurality of radially projecting fins 50 are coupled by brazing or other means to the hot end wall 22 such that they extend inwardly therefrom. Also, a plurality of radially projecting fins 52 are coupled to the cold end wall 24 such that they extend outwardly therefrom. The fins 50 and 52 facilitate convective and radiative heat transfer to and from the cell 12. Therefore, inconel or stainless steel are the preferred materials for the fins 50 and aluminum or nickel are the preferred materials for the fins 52.

As illustrated, the cell stack 10 includes multiple cells 12 secured together by interconnecting the side walls 14 and 18 of individual cells 10. This may be accomplished by spot welding or other means. Preferably, an insulator 54, such as boron nitride, is deposited between individual cells 12 to electronically isolate one cell from another. It is also preferred that the cell walls be somewhat flexible to withstand thermal differences experienced along the length of the cell stack 10.

As can be seen in the illustrated embodiment of the present invention, the cells 12 of the cell stack 10 are preferably arranged coaxially in a stack such that consecutive openings 16 and 20 of adjacent cells 12 form an elongated axial bore 56 along a central longitudinal axis 58 of the cell stack 10. The bore 56 conveniently serves as a central heat input region for each of the cells 12.

Figure 2:
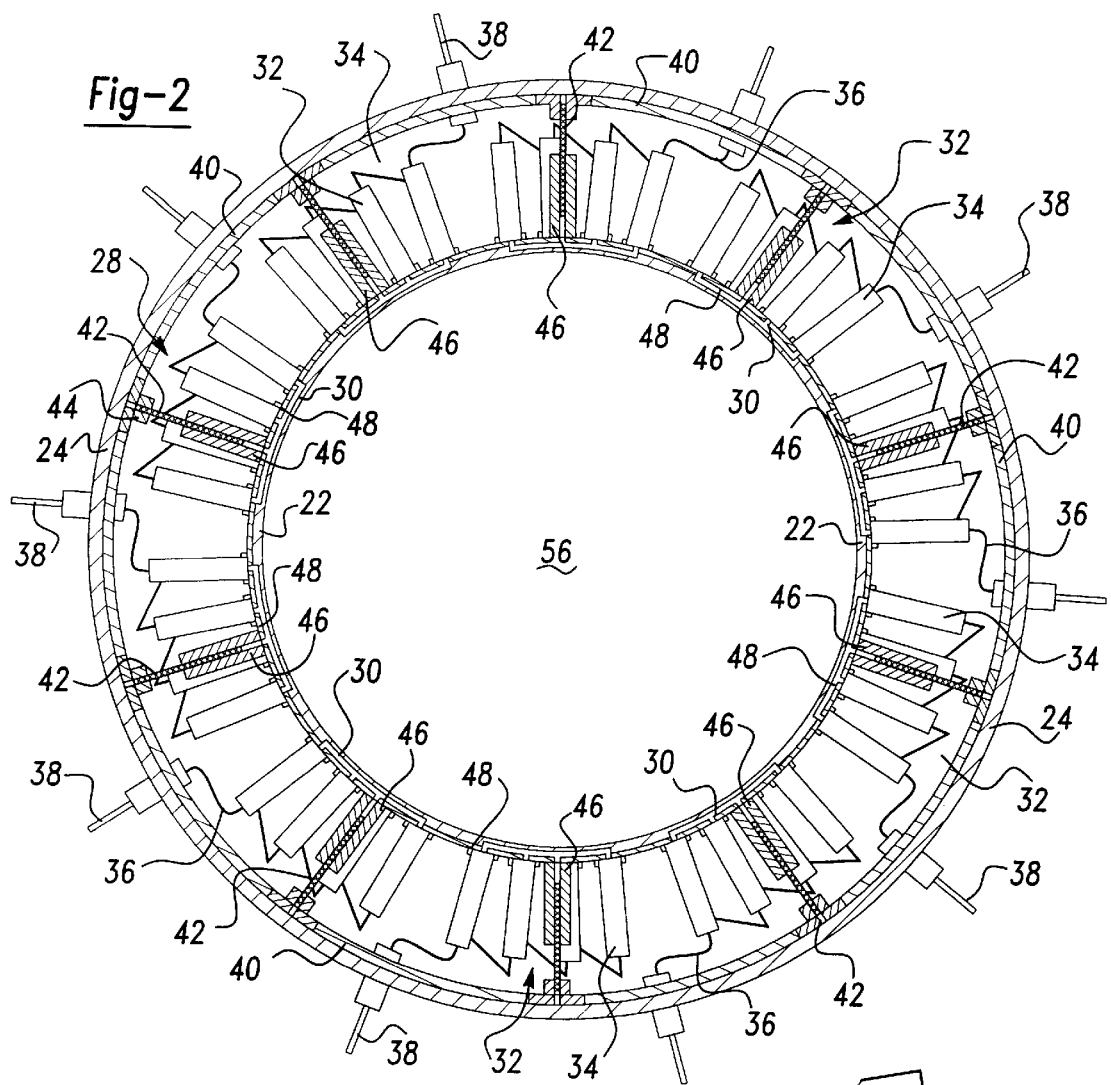
FIG. 2 is a section view of an AMTEC cell from the cell stack of FIG. 1 including radially projecting solid electrolyte elements.

Turning now to FIG. 2, a single cell 12 from the cell stack 10 depicted in FIG. 1 in greater detail. An annularly-shaped condenser 40 is coupled adjacent the cold end wall 24 between the side walls 14 and 18. The condenser 40 is disposed in and therefore communicates with the low-pressure zone 28 for condensing alkali metal vapor migrating through the low-pressure zone 28. For this purpose, the condenser 40 is preferably formed of a material such as stainless steel. At least one artery 42, preferably a stainless steel tube packed with metallic felt, is coupled to the condenser 40 by a mounting member 44 for directing the condensed alkali metal toward the high pressure zone 48. Preferably, the mounting member 44 is formed from stainless steel felt and is configured as a cylindrical receptacle or socket for sidably receiving an end of the artery 42 to allow relative movement therebetween which may occur due to thermal expansion. Alternatively, the artery 42 may be fixedly secured to the mounting member 44 by brazing or other means.

The artery 42 extends from the condenser 40 through the low pressure zone 28 towards the hot end wall 22. The artery 42 terminates at a discrete or integrally formed evaporator 46 which is exposed at a first end to the high pressure zone 30. Preferably, the evaporator 46 consists of a suitably shaped metallic felt packed within a metallic tubular housing. The evaporator 46 serves to evaporate the condensed alkali metal into the high pressure zone 30 where it may flow to the interior of the BASE tubes 34.

An annularly-shaped solid electrolyte support member 48 is coupled in spaced relation to the hot end wall 22 between the side walls 14 and 18 for supporting the solid electrolyte structure 32. Inconel is the preferred material for the support member 48. The solid electrolyte structure 32 is secured about the radial outer surface of the support member 48 by brazing or other means such that the BASE tubes 34 radially project from the support member 48 towards the cold end wall 24.

The solid electrolyte structure 32 separates the chamber 26 into the low-pressure zone 28 and the high-pressure zone 30 as described above and serves as an ion selective membrane for the working fluid flowing within the cell 12. The neutral sodium atoms incident on one surface of the solid electrolyte structure 32 release their electrons to a first electrode overlaying one surface of the solid electrolyte structure 32. The resulting sodium ions pass through the solid electrolyte structure under the applied pressure differential, and the emerging sodium ions are neutralized at another electrode disposed on an opposed surface of the solid electrolyte structure 32 by electrons returning from the external load. As such, the pressure differential within the cell 12 drives the sodium through the solid electrolyte structure 32 thereby creating an electrical current which passes through the external load resistance.

Figure 3:
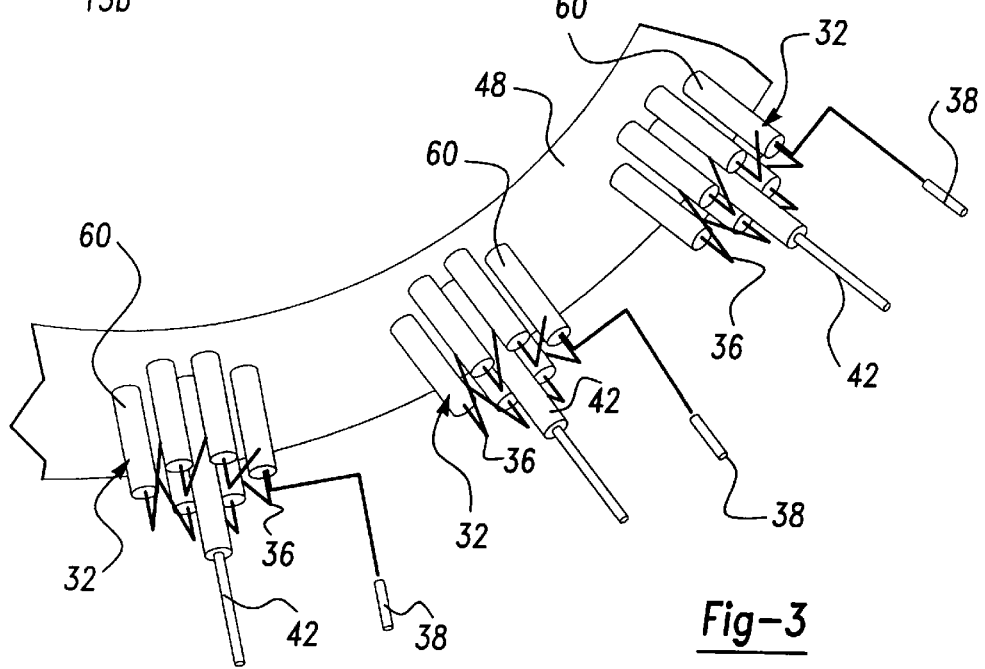
FIG. 3 is a perspective view of a first embodiment solid electrolyte structure having radially projecting solid electrolyte tubes in accordance with a first aspect of the present invention.

Referring now to FIG. 3, a first embodiment solid electrolyte structure 32 is illustrated. As illustrated, a plurality of BASE tubes 60 are mounted to the support member 48 so as to be concentrically arranged about the artery 42. Subgroups of the tubes 60 are electrically connected in series by the leads 36. The leads 36 are coupled to a terminal 38 projecting outwardly from the cell 12 for delivering current therefrom. Although any number of electrical arrangements can be implemented in the present invention, it is presently preferred to provide a terminal 38 after every six or twelve BASE tubes 60 to provide 3.5 volts or 7 volts of output power respectively. The first embodiment solid electrolyte structure 12 is particularly well suited for low cost fabrication and is therefore preferred for this purpose.

Figure 4:
FIG. 4 is a perspective view of a second embodiment solid electrolyte structure having radially projecting solid electrolyte tubes in accordance with another aspect of the present invention.

As shown in FIG. 4, other embodiments of the solid electrolyte structure 32 may also be employed in the cell 12. In the illustrated embodiment, a plurality of BASE tubes 60 are mounted in rows and columns radially about the support member 48. In this embodiment, the artery 42 is preferably located adjacent one of the side walls 14 or 18 (FIG. 1). In another embodiment of the present invention (not illustrated), the cell wall itself may serve as the artery 42. Subgroups of the tubes 60 are electrically coupled in series by leads 36 which are connected to the terminal 38. As illustrated, a terminal is provided after every twelve tubes 60 to provide 7 volts of power. It should be appreciated that in order to establish a potential difference within the cell 12, consecutive subgroups of tubes 60 are oppositely electrically interconnected to produce positive or negative power output respectively.

In operation, neutral sodium atoms incident on the high pressure side of the electrolyte structure 32 release their electrons to an inner electrode. The resulting sodium ions pass through the solid electrolyte structure 32 under an applied pressure differential and the emerging sodium ions are neutralized at an outer electrode by electrons returning from the external load. The neutral sodium vapor at the outer electrode migrates through the low-pressure zone 24 and condenses at the condenser 40. The sodium condensate flows downward through each artery 42 to an evaporator 46. The liquid sodium evaporates at each evaporator 46 and the high-pressure sodium vapor is returned via a plenum between the hot end cap 22 and support member 48 to the high-pressure side of the solid electrolyte structure 32 completing the cycle.

Therefore, it can be appreciated that the present invention provides an AMTEC cell having a radially projecting solid electrolyte structure. The radial configuration of the solid electrolyte structure enables many more BASE elements to be included within a single cell than according to the prior art while minimizing available cell wall area for parasitic heat loss and while only requiring a single centralized heat input region. The radial configuration of BASE elements also provides an expanding area (and reduced pressure drop) for alkali metal vapor flow between the solid electrolyte structure toward the condenser. Furthermore, multiple cells may be secured adjacent to one another in an elongated stack to yield a centralized heat input region for all of the cells.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An alkali metal thermal to electric conversion cell comprising:

an inner wall having a preselected radius of curvature;

an outer wall having a second radius of curvature oppositely disposed in spaced relation to said inner wall so as to define a volume therebetween;

a solid electrolyte support member disposed proximate said inner wall in said volume so as to define a plenum between said support member and said inner wall;

a condenser coupled adjacent said outer wall in said volume opposite said support member;

an artery return channel interconnecting said condenser and said plenum for conveying condensed alkali metal from said condenser through said volume to said plenum; and a solid electrolyte structure having a plurality of electrolyte elements radially extending from said solid electrolyte support member along said radius of curvature into said volume, said solid electrolyte structure separating said cell into a high pressure zone and a low pressure zone and being electrically connected to an external load circuit for delivering a current from said cell.

2. The cell of claim 1 wherein said inner wall and said outer wall are interconnected by a side wall to define an internal volume in said cell.

3. The cell of claim 1 further comprising:

a first disk-shaped side wall; and a second disk-shaped side wall disposed in spaced relation opposite said first disk-shaped side wall, said first and second side walls being interconnected by said inner and outer walls to form a cylindrically shaped cell structure and an internal volume in said cell.

4. The cell of claim 1 wherein said inner wall is substantially cylindrically shaped and includes a first inner radial surface having a first known diameter and said outer wall is substantially cylindrically shaped and includes a second inner radial surface having a second known diameter, said second known diameter being greater than said first known diameter such that said outer wall is coaxially located around said inner wall.

5. The cell of claim 1 wherein said solid electrolyte structure includes a plurality of beta-alumina solid electrolyte members divergently projecting from an outer radial surface of said support member so as to define an expanding area for alkali metal vapor flow within said volume of said cell.

6. The cell of claim 1 wherein said solid electrolyte structure includes a first surface overlaid with a first permeable electrode and a second surface overlaid with a second permeable electrode, said second permeable electrode electrically communicating with said first permeable electrode and said external load circuit.

7. The cell of claim 1 wherein said artery return channel is coupled to an evaporator member communicating with said plenum for evaporating said condensed alkali metal returning from said condenser into said high pressure zone of said cell.

8. The cell of claim 1 wherein said inner wall receives heat from a central heat source.

9. The cell of claim 1 wherein said inner wall is substantially cylindrical.

10. The cell of claim 1 wherein said solid electrolyte support member is substantially cylindrical.

11. The cell of claim 1 wherein said outer wall is substantially cylindrical.

12. The cell of claim 1 wherein said condenser is substantially cylindrical.

13. An alkali metal thermal to electric conversion cell comprising:

a cylindrically shaped hot end wall;

a cylindrically shaped cold end wall concentrically located in spaced relation about said hot end wall;

an annularly shaped solid electrolyte structure support member disposed proximate said hot end wall so as to define a plenum therebetween;

a solid electrolyte structure having a plurality of electrolyte elements coupled to said support member so as to radially project therefrom towards said cold end wall, said solid electrolyte structure separating said cell into a high pressure zone and a low pressure zone and electronically communicating with an external load circuit for delivering a current from said cell;

an annularly shaped condenser disposed adjacent said cold end wall and communicating with said low pressure zone for condensing alkali metal vapor migrating through said low pressure zone from said solid electrolyte structure;

an artery return channel coupled to said condenser for directing said condensed alkali metal from said condenser toward said high pressure zone; and an evaporator coupled to said artery for evaporating said condensed alkali metal into said high pressure zone.

14. The cell of claim 13 further comprising:

a first disk-shaped member coupled to a first edge of said hot end wall and a first edge of said cold end wall; and a second disk-shaped member coupled to a second edge of said hot end wall and a second edge of said cold end wall, said first and second disk members coacting with said hot and cold end walls to enclose an interior volume of said cell.

15. The cell of claim 14 wherein said first and second disk members include central openings therein providing access to said hot end wall.

16. The cell of claim 14 wherein said disk-shaped members are corrugated.

17. The cell of claim 13 wherein said solid electrolyte structure further comprises a plurality of beta alumina solid electrolytes radially projecting from said support member.

18. The cell of claim 17 wherein subgroups of said plurality of beta alumina solid electrolytes are electrically connected in series.

* * * * *